(12) United States Patent
Danis

(10) Patent No.: US 7,019,739 B2
(45) Date of Patent: Mar. 28, 2006

(54) CONTROL AND MANAGEMENT METHOD FOR THE STATUS OF THE BATTERY OF A PORTABLE MULTIMEDIA DEVICE

(75) Inventor: Frédéric Danis, Le Port Marly (FR)

(73) Assignee: NEC Corporation, Tokyo (JP)

( * ) Notice: Subject to any disclaimer, the term of this patent is extended or adjusted under 35 U.S.C. 154(b) by 199 days.

(21) Appl. No.: 10/188,920

(22) Filed: Jul. 5, 2002

(65) Prior Publication Data

US 2003/0020700 A1    Jan. 30, 2003

(30) Foreign Application Priority Data

Jul. 6, 2001    (FR) ................... 01 09016

(51) Int. Cl.
*G09G 5/00* (2006.01)

(52) U.S. Cl. .................. 345/211; 713/320; 455/574

(58) Field of Classification Search ........ 345/211–213; 713/300–340; 455/572–574
See application file for complete search history.

(56) References Cited

U.S. PATENT DOCUMENTS

| | | | |
|---|---|---|---|
| 5,864,646 A * | 1/1999 | Searby | ............. 386/68 |
| 5,949,484 A | 9/1999 | Nakaya et al. | |
| 6,710,578 B1 * | 3/2004 | Sklovsky | ............. 320/127 |
| 2001/0020940 A1 * | 9/2001 | Nakazato et al. | ............. 345/418 |
| 2001/0021663 A1 * | 9/2001 | Sawada et al. | ............. 455/572 |

FOREIGN PATENT DOCUMENTS

| | | |
|---|---|---|
| EP | 1 059 812 A2 | 12/2000 |
| EP | 1 185 104 A1 | 3/2002 |
| WO | WO 99/09747 A1 | 2/1999 |

* cited by examiner

*Primary Examiner*—Alexander Eisen
(74) *Attorney, Agent, or Firm*—Sughrue Mion, PLLC

(57) ABSTRACT

The invention is concerned with a method to control and manage the status of a battery of a portable multimedia device equipped with means to memorize digital data representing audio and video sequences, with means to process the sequences and with a display screen of the video sequences. The process comprises the steps of downloading an audiovisual data flow in the means of memorization; evaluating of the energy available in the battery; and selecting either first processing of the memorized data that needs only a part of the energy available in the battery, so as to conserve a pre-determined quantity of energy, or second processing of the memorized data that needs all the available energy.

12 Claims, 2 Drawing Sheets

CONTROL AND MANAGEMENT METHOD FOR THE STATUS OF THE BATTERY OF A PORTABLE MULTIMEDIA DEVICE

TECHNICAL FIELD

The invention is concerned with a method to control and manage the status of the battery of a portable multimedia device equipped with means to memorize digital data representing audio and video sequences, with means to process the sequences and with a display screen of the video sequences.

The invention is also concerned with a multimedia device in which the process is used.

DESCRIPTION OF THE BACKGROUND ARTS

With the development of the UMTS (Universal Mobile Telecommunication System) third-generation (3G) mobile communication system, a user will be able to have at his or her disposal one or more than one mobile terminals (portable telephone, PDA: Portable Digital Assistant, pocket videophone or micro-computer). This will allow high-speed communication for the exchange of voice and image data while in motion and telecommuting situations. The need for data and video services (database, file transfer, high resolution facsimile, mobile video telephony) and the interconnection with broadband networks require an increasing amount of processing and a large quantity of energy.

Thus, in case of mobile telephones, the download time of a video image or audio file in the multimedia applications MPEG4/H.263 and MP3 and the display of the video images involve a great consumption of energy, which, as a result, reduces talking time. Moreover, the batteries now obtainable in the market do not supply enough power, considering the increase in calculation required by multimedia applications.

SUMMARY OF THE INVENTION

Therefore, the purpose of the present invention is to provide a method which makes it possible to economize the energy of the batteries in multimedia devices.

In accordance with the invention, the method comprises the steps of:

downloading an audiovisual data flow in the means of memorization associated with the multimedia device;

evaluating the energy available in the battery; and selecting either first processing of the memorized data that needs only a part of the energy available in the battery, so as to conserve a pre-determined quantity of energy, or second processing of the memorized data that needs all the available energy.

According to the present invention, first processing consists in displaying all the frames of a memorized video sequence and the second processing consists in displaying only a part of the frames of the sequence.

In a preferred manner of realizing the invention, in which digital data include images coded according to the MPEG standard, the first processing consists in displaying all the frames of a video sequence and the second processing consists in displaying only the Intra type frames or a fraction of the Intra frames.

In accordance with the invention, the method is used in a multimedia device that comprises:

an interface adapted to download an audiovisual data flow to the means of memorization associated with the multimedia device;

means to evaluate the energy available in a battery; and means to select either first processing of the memorized data needing only a part of the energy available in the battery of the multimedia device, so as to conserve a pre-determined quantity of energy, or second processing of the memorized data needing all the available energy.

The multimedia device can be a portable telephone, a PDA or a micro-computer.

BRIEF DESCRIPTION OF THE DRAWINGS

Other features and advantages of the invention shall emerge from the description that follows, which is taken as a non-limited example in reference to the attached drawings in which.

DETAILED EXPLANATION OF THE INVENTION

The description given below illustrates an example of application of the process according to the invention to economize the energy of the battery of a third-generation mobile telephone.

Figure 1:
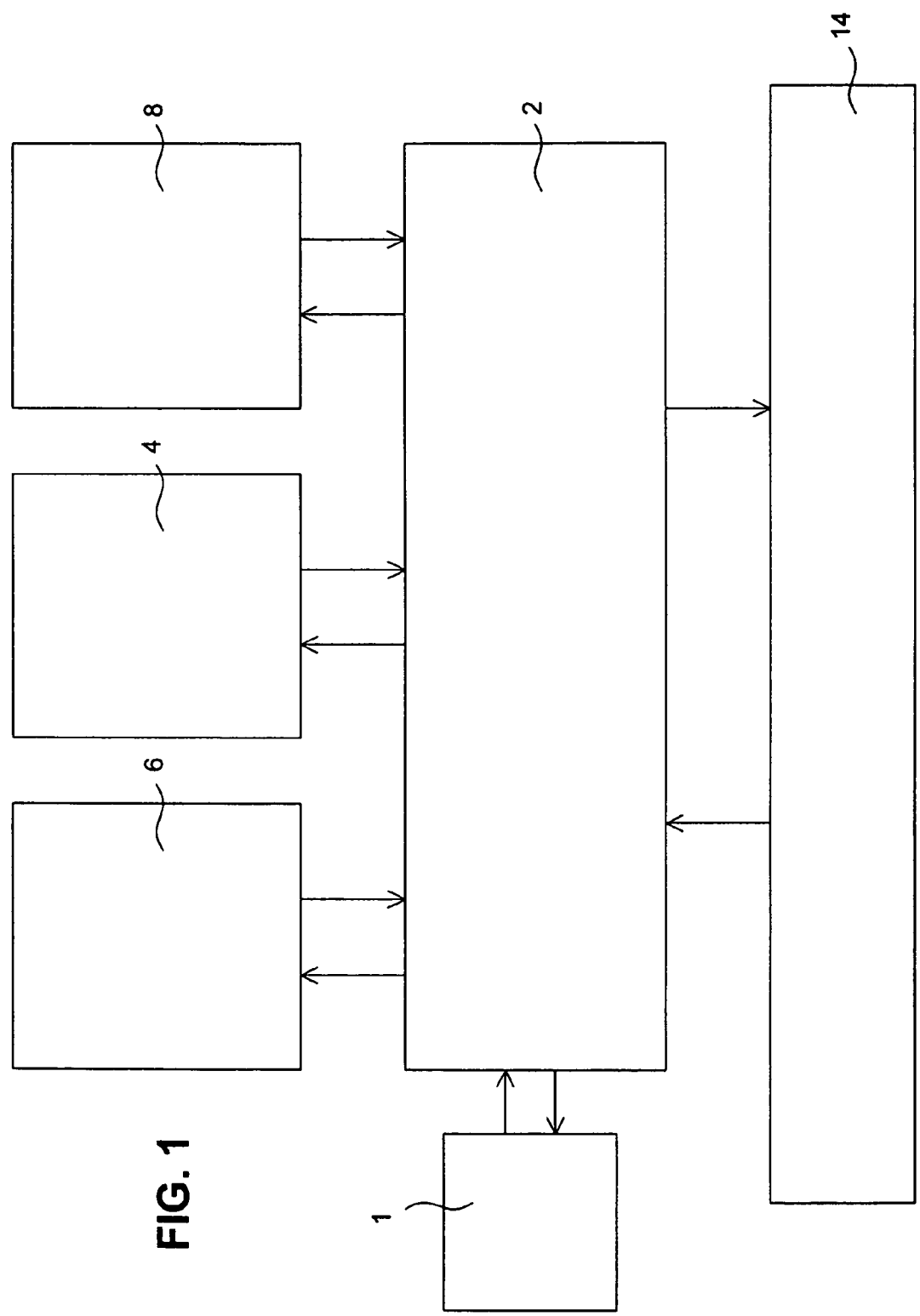
FIG. 1 shows a block diagram of a multimedia device in which the method is used, in accordance with the invention.

FIG. 1 schematically illustrates the structure of such a telephone. The latter contains a transmitting/receiving module 1, a central processing unit 2, an interchangeable memory 4, a keyboard 6, an LCD screen 8 and a battery 14 with a pre-determined charge.

The memory 4 is intended to memorize the video frames received at the moment of communication, before they are displayed on the screen 8. This memory 4 can be either integrated into the mobile telephone or composed of a removable card which can be plugged into a location on the mobile telephone prepared for this purpose. The user can then use a set of interchangeable memory cards which allow the storage of images while waiting for them to be transferred to a computer, for example.

A feature of the invention allows the user to select to display all of the frames of a memorized image or a part of these frames.

Figure 2:
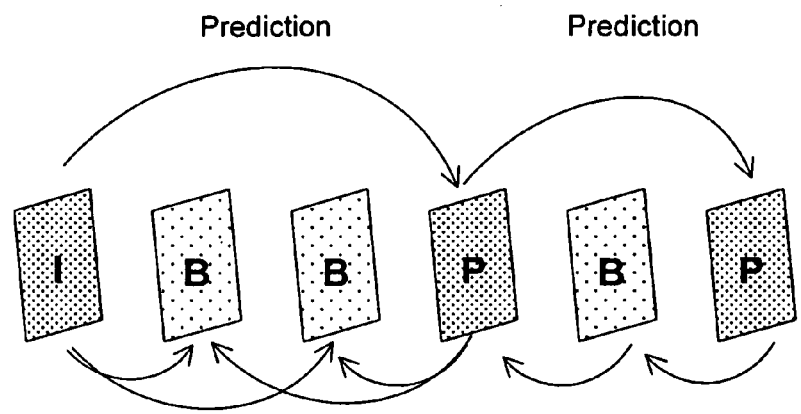
FIG. 2 schematically illustrates the chaining of three types of MPEG standard video frames.

FIG. 2 schematically illustrates the chaining of three types of MPEG standard video frames. It should be noted that the specifications of the MPEG-4 and H.263 converters are based on the principle of the compensating movement using the strong temporal redundancy of the successive images that compose a video sequence. In fact, two successive images are often practically identical and differ from each other only in the fact that a tiny part of the image has moved. Therefore, at the moment of the transmission of a video sequence, in place of the transmission of all the frames of an image to the decoder, only the difference between two successive images and the displacement vector associated with this difference are transmitted. The decoder restores the image from this difference and the displacement vectors calculated in advance.

To this end, the MPEG standard defines three types of image:

(1) Frames I (intra), which are coded without reference to other images, that is, they contain all the elements required for their restoration by the decoder without decoding an entire of video sequence;

(2) Frames P (predicted), which are coded in relation to the preceding image type, I or P, due to prediction technology with compensating movement. These frames are restored from the differences calculated between the current frame and those which precede it; and (3) Frames B (bi-directional), which are coded by interpolation between the two preceding images of type I or P that encloses them.

Figure 3:
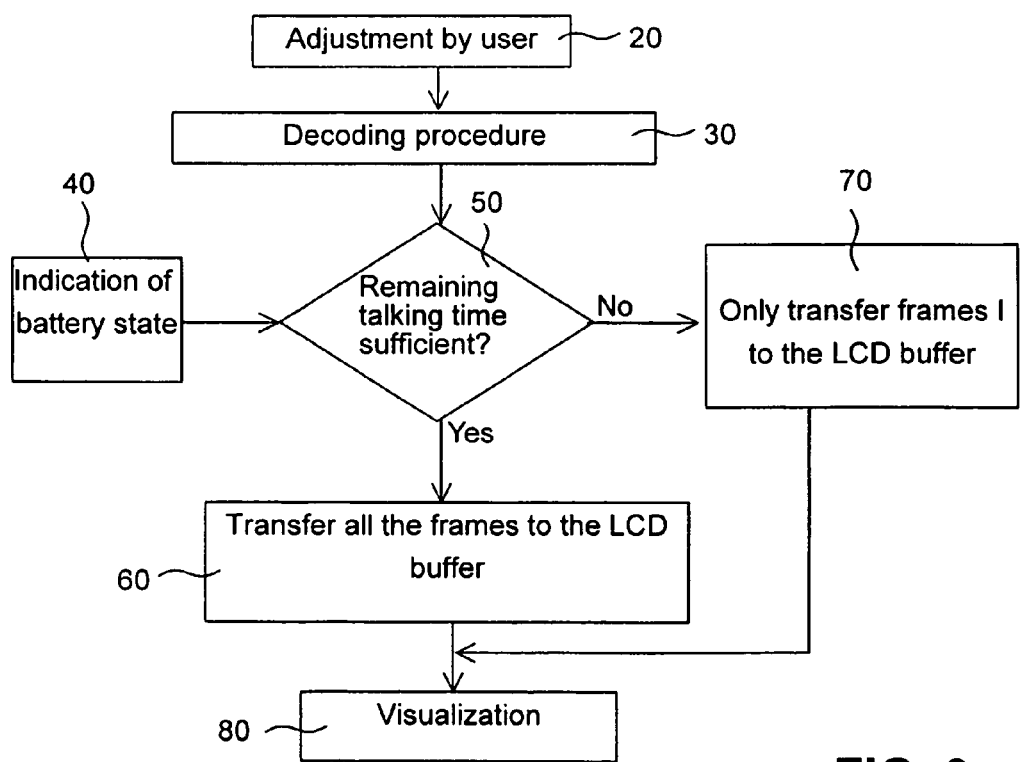
FIG. 3 shows a flow chart giving an example of application of the method, in accordance with the invention.

FIG. 3 gives a flow chart showing the use of the process in accordance with the invention, to economize the energy of the battery of a third-generation mobile telephone, when a video sequence transmitted in the form of binary flow is displayed.

At step 20, the user selects the frames which must be displayed. For this purpose, a menu scrolling on the screen 8 presents several display options. The user can program a partial display of the frames I from a video sequence stored in the memory 8 in advance, and as a function of the talking time the user wishes to conserve. The user can, for example, conserve a minimum duration of time for voice communication. By selecting this minimum duration, the processing unit 2 adapts the display type and transmits to the screen 8 only the frames I or a part of these frames. The user can modify at any moment the programming of the display by increasing or decreasing the duration of voice communication he or she wishes to conserve. The user can also select the display of all the frames I, P and B of the video sequence.

At step 30, the central unit directs the automatic decoding of the received video sequences and the memorization of these sequences, and evaluates the probable duration required to display the memorized video sequence da.

At step 40, the central unit 2 reviews the charge state of the battery 14 and directs the display of the probable duration of communication remaining still available dc, and of the probable duration required to display the memorized video sequence da.

At step 50, the central unit 2 compares the probable duration of communication remaining still available dc with the sum (dv+da) of the duration of voice communication dv that the user desires to conserve and the probable duration required to display the memorized video sequence da and:

If dc is greater than dv+da, then the central unit 2 directs, at step 60, the display of all the frames I, P and B of the memorized video sequence;

If dc is smaller than dv+da, then the central unit 2 directs, at step 70, the display of the frames I or of a part of these frames so as to conserve a duration at least equal to dv at the end of the display.

At step 80, the frames to be displayed are transmitted to the screen 8.

For example, TABLES I, II, III and IV given below show, respectively, the video frames at the input of a decoder integrated into the mobile telephone, at the output of the decoder, at the input of a display manager, which drives the screen 8 if dc is smaller than dv+da, and at the output of the display manager if dc is greater than dv+da.

TABLE I

Input of the decoder:

| Frame No. | 1 | 4 | 2 | 3 | 7 | 5 | 6 | 10 | 8 | 9 | 13 | 11 | 12 |
|---|---|---|---|---|---|---|---|---|---|---|---|---|---|
| Type | I | P | B | B | P | B | B | I | B | B | P | B | B |

TABLE II

At the output of the decoder:

| Frame No. | 1 | 2 | 3 | 4 | 5 | 6 | 7 | 8 | 9 | 10 | 11 | 12 | 13 |
|---|---|---|---|---|---|---|---|---|---|---|---|---|---|
| Type | I | B | B | I | B | B | P | B | B | I | B | B | B |

TABLE III

At the input of the display manager, if dc is smaller than dv + da

| Frame No. | 1 | 2 | 3 | 4 | 5 | 6 | 7 | 8 | 9 | 10 | 11 | 12 | 13 |
|---|---|---|---|---|---|---|---|---|---|---|---|---|---|
| Type | I | | | | | | | | | I | | | |

TABLE IV

At the output of the display manager, if dc is greater than dv + da

| Frame No. | 1 | 4 | 2 | 3 | 7 | 5 | 6 | 10 | 8 | 9 | 13 | 11 | 12 |
|---|---|---|---|---|---|---|---|---|---|---|---|---|---|
| Type | I | P | B | B | P | B | B | I | B | B | P | B | B |

According to the invention, the process thus makes it possible to reserve a minimum duration of voice communication by dynamically modifying the display of the video sequences processed in advance.

This process is applicable to all the devices using MPEG-2 or MPEG-4/H.263 applications as UMTS.

In the means of realization described above, the video parameters are decoded in the mobile telephone immediately before the reconstitution on the LCD screen 8.

What is claimed is:

1. A method to control and manage a status of a battery of a device equipped with means to memorize data and means to process said data, the method comprising:
    determining energy required to process said data;
    evaluating energy available in the battery; and
    selecting processing of the data based on a comparison of the energy required to process said data with the energy available in the battery so as to conserve a predetermined quantity of battery energy.

2. The method in accordance with claim 1, wherein the data includes a video sequence, and the processing includes a first processing that displays all frames of the video sequence, and a second processing that displays only a part of the frames of said sequence.

3. The method in accordance with claim 2, wherein coding of the data is according to MPEG standards, and the second processing displays only the frames of Intra type, or a fraction of said Intra frames.

4. The method according to claim 1, further comprising downloading the data into the means to memorize.

5. A device with means to memorize data and means to process said data, comprising:
    means to determine energy required to process the data;
    means to evaluate energy available in a battery; and
    means to select processing of the data based on a comparison of the energy required to process the data with the energy available in the battery so as to conserve a predetermined quantity of battery energy.

6. The device according to claim 5, wherein the data includes a video sequence, and the processing includes a first processing that displays all frames of the video sequence, and a second processing that displays only a part of the frames of said sequence.

7. The device according to claim 6, wherein coding of the data is according to MPEG standards, and the second processing displays only the frames of Intra type, or a fraction of said Intra frames.

8. The device according to claim 5, wherein the device is a telephone, a micro-computer, or a PDA, or a combination thereof.

9. The device according to claim 5, wherein the device further comprises an interface to download the data to the means to memorize.

10. A computer readable medium including a program comprising instructions, which when executed, cause a device to:
  determine energy required to process data stored in a memory of the device;
  evaluate energy available in a battery of the device; and
  select processing of the data based on a comparison of the energy required to process the data with the energy available in the battery so as to conserve a predetermined quantity of battery energy.

11. A method to control and manage a status of a battery of a device equipped with means to memorize data and means to process the data, the method comprising:
  determining a first duration of time required to process the data;
  determining a second duration of time representing energy of the battery of the device as a function of available communication time; and
  selecting processing of the data based on a comparison of the first duration of time with the second duration of time so as to conserve a predetermined quantity of battery energy.

12. A device with means to memorize data and means to process the data, comprising:
  means to determine a first duration of time required to process the data;
  means to determine a second duration of time representing energy of a battery of the device as a function of available communication time; and
  means to select processing of the data based on a comparison of the first duration of time with the second duration of time so as to conserve a predetermined quantity of battery energy.

* * * * *